(12) United States Patent
Hughes et al.

(10) Patent No.: US 7,228,763 B2
(45) Date of Patent: Jun. 12, 2007

(54) CABLE INSULATION STRIPPING MACHINE

(76) Inventors: Tex R. Hughes, 4429 Barnes Rd., Millington, MI (US) 48746; Jerald T. Orser, 10117 N. Oak Rd., Otisville, MI (US) 48463; Thomas L Ward, 5477 Cottonwood, Swartz Creek, MI (US) 48473

( * ) Notice: Subject to any disclaimer, the term of this patent is extended or adjusted under 35 U.S.C. 154(b) by 0 days.

(21) Appl. No.: 11/507,595

(22) Filed: Aug. 22, 2006

(65) Prior Publication Data
US 2007/0042634 A1    Feb. 22, 2007

Related U.S. Application Data

(60) Provisional application No. 60/709,816, filed on Aug. 22, 2005.

(51) Int. Cl.
*H02G 1/12* (2006.01)
(52) U.S. Cl. .......................... 81/9.51; 81/9.4
(58) Field of Classification Search ............... 81/9.4, 81/9.51; 29/426.3
See application file for complete search history.

(56) References Cited

U.S. PATENT DOCUMENTS 5,230,260 A * 7/1993 Bell ............................ 81/9.4
5,809,849 A 9/1998 Coffey et al.
5,865,085 A 2/1999 Vollenweider
6,401,570 B1 * 6/2002 Nadeau ........................ 81/9.4
6,694,853 B2 2/2004 Adams

FOREIGN PATENT DOCUMENTS

DE    3412044 A1    10/1995

* cited by examiner

*Primary Examiner*—David B. Thomas
(74) *Attorney, Agent, or Firm*—Richard C. Litman (57) ABSTRACT

The cable insulation stripping machine is adapted for mounting to a machine with a motor having a reversible rotating chuck and is operable to remove the outer insulating jacket from a multi-conductor cable. The cable insulation stripping machine has a stripping spindle rotated by the chuck. At one end of the stripping spindle is a stripping and take up spool. The spool contains a self-adjusting slot, which grips a flap cut into the outer jacket at the end of a multi-conductor cable. As the spindle is rotated, the pinching action of the spool slot removes the insulation from the cable and the stripped insulation winds onto the body of the spool. A pair of cable guides is provided, the first guide for support incoming cable on and feeding the cable to the stripping and take up spool, the second guide for receiving the stripped conductors as they exit the machine.

16 Claims, 7 Drawing Sheets

CABLE INSULATION STRIPPING MACHINE

CROSS-REFERENCE TO RELATED APPLICATION

This application claims the benefit of U.S. Provisional Patent Application Ser. No. 60/709,816, filed Aug. 22, 2005.

BACKGROUND OF THE INVENTION

1. Field of the Invention

The present invention relates to an apparatus for removing the insulating jacket from cable, and more particularly to a cable insulation stripping machine for stripping the outer insulation from multi-conductor cables.

2. Description of the Related Art

A very common activity for technicians installing electrical equipment is stripping the insulating jacket from cables and wires. Electrical cables are made up of one or more conductors contained in an insulating jacket. The jacket is typically made of an elastomeric material, such as neoprene rubber, silicon rubber, or a polymeric material such as Polyvinylidene Fluoride (PVDF). Electricians strip the insulation from cables in order to expose the conductors. It is necessary to gain access to the conductors in order to connect cables carrying electrical power, control, and other signals to electrical equipment.

Removing the outer insulation from large multi-conductor cables is a particularly onerous task. Multi-conductor cables consist of two or more insulated conductors contained in an outer insulating jacket. Multi-conductor cable may also contain filler, which is material added to occupy the interstitial spaces between the conductors to give the multi-conductor cable a round shape. A typical manual process for removing the outer jacket involves making one or more longitudinal cuts into the outer jacket using a sharp knife and then pulling the jacket away from the cable until the desired length of the internal conductors is exposed. An electrician performing this operation must be careful when making these cuts on a multi-conductor cable not to cut through the insulation on the inner conductors, because doing so would compromise the insulation on these conductors producing possible short circuits during use. For large size electrical conductors, pulling the outer jacket away from the conductors in the jacket may be physically demanding because of the difficulty in flexing the thick outer jacket material and because the jacket adheres to the filler material inside the cable. Removing the cut insulation may be made easier by making multiple cuts into the insulation, allowing the jacket insulation to be removed in narrow strips. However making the additional cuts requires additional time and labor by the electrician, and increases the likelihood of cutting into the insulation of the inner conductors, or of cutting the conductors themselves.

When completing a large installation, the need to strip insulation from both ends of large numbers of cable requires substantial time and labor and adds significantly to both the expense and the completion time for a construction project. In addition, removing the heavy insulation is physically taxing and may result in repetitive motion injuries as well as injuries of other types to the hands and wrists of the electrical installers.

Mechanical or electrically operated machines to strip the outer jacket from multi-conductor cables can speed up the stripping task and make the task less physically demanding. Typically, devices for stripping cable utilize blades to cut through the insulation along the length of the cable and may also include a mechanism for separating the cut insulation from the cable. Because different sizes and types of multi-conductor cable have different diameters, different thickness of insulation, and different arrangements of the internal conductors, these devices may need to make adjustments to the positions of the cutting blades and to other parts of the devices to properly strip the outer insulating jacket from the cable without also cutting through the insulation of the internal conductors or through the conductors. Making these adjustments may increase the time spent stripping the cable or may alternatively result in technicians attempting to strip the jacket from a multi-conductor cable using an inappropriate blade adjustment or setting. An inappropriate setting may require repeating the stripping operation, may damage the cable so that the cable must be discarded, or may even result in installing the cable with damage to the inner conductor insulation, leading to electrical short circuits and the risk of fire, shock, equipment downtime, and damage to equipment.

German Patent No. 3,412,044, published Oct. 3, 1985, describes a device for removing insulation from cables for recycling. The cable stripper described in this publication converts the conductor and insulation of the cable to granular form for recycling, rather than removing the outer cable jacket to leave the internal conductors intact.

Thus, a cable insulation stripping machine solving the aforementioned problems is desired.

SUMMARY OF THE INVENTION

The cable insulation stripping machine is adapted for mounting to a host machine with motor having a reversible, rotating chuck, such as a pipe threading machine, and is operable to remove the outer insulating jacket from a multi-conductor cable. The cable insulation stripping machine comprises a stripping spindle rotated by the host machine. At one end of the stripping spindle is a stripping and take up spool. The spool includes a self-adjusting slot, which grips a flap cut into the outer jacket at the end of the multi-conductor cable. As the spindle is rotated, the pinching action of the spool slot removes the insulation from the cable, and the lower half of the stripped insulation winds onto the body of the spool. A pair of cable guides is provided. The first guide is an entry guide and supports incoming cable and feeds the cable to the stripping and take up spool. The second guide is an exit guide and receives the stripped conductors as they exit the cable insulation stripping machine.

The exit guide surface is inclined away from the spindle to direct the stripped conductors and the upper half of the insulation away from the stripping spindle. The inclined exit guide is provided with a spring-biased slide support to push the front edge of the included guide into the spindle spool, thus positioning the exit guide to collect and direct the stripped conductors as they come off of the stripping spindle and prevent the stripped conductors from winding onto the spool. The front edge of the inclined guide is provided with a roller bearing that serves as the point of contact with the spindle spool, and allows the spindle spool to rotate freely while in contact with the exit cable guide.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
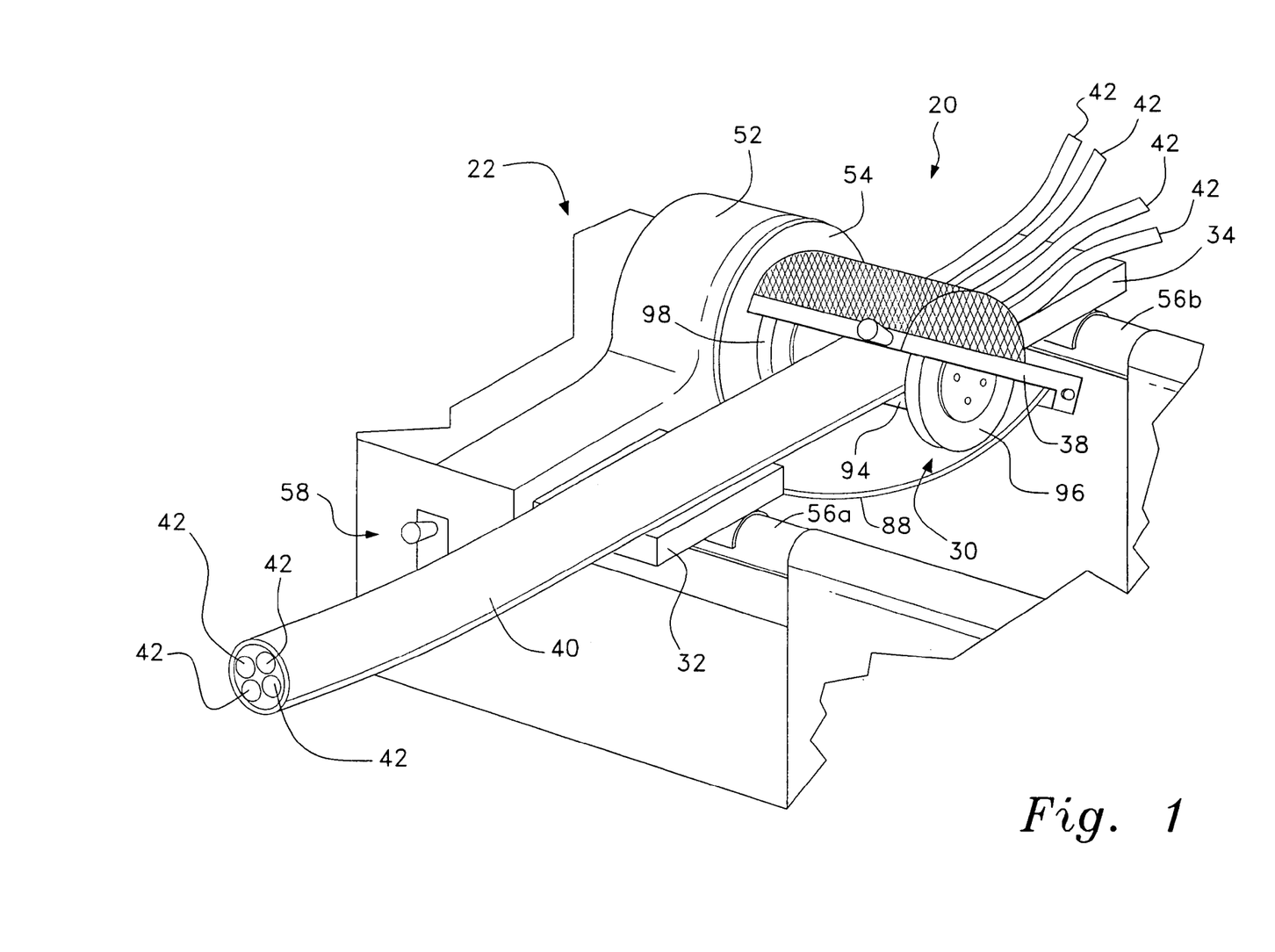
FIG. 1 is an environmental perspective view of a cable insulation stripping machine according to the present invention mounted on a pipe threading machine.

The present invention is a cable insulation stripping machine for stripping the outer insulating jacket from multi-conductor cable. A cable insulation stripping machine 20 in accordance with the present invention is shown in FIGS. 1–5. In the embodiment shown, the cable insulation stripping machine 20 is an after-market device adapted to fit on a pipe-threading machine 22 (or other similar type host machines). The pipe threading machine 22 includes a motor 52 to provide the mechanical energy for the stripping operation, and the supporting means for holding and positioning the parts of the cable insulation stripping machine 20. It will be understood, however, that the machine 20 may be attached to any host machine having a motor with a rotating chuck capable of reversing the direction of rotation, or may be made as an original equipment dedicated cable insulation stripping machine for use in manufacturing plants by providing the machine with a reversible rotating motor operatively connected to the spindle axle (described below). It should be understood that FIG. 1 is intended to illustrate any of these embodiments, as the details of the chuck or other motor to axle attaching means have not been shown.

As can be appreciated by referring to FIG. 1, the cable insulation stripping machine 20 includes a cable entry guide 32 for guiding an insulated cable 40 into the machine, an exit cable tray or guide 34 for guiding the stripped conductors 42 out of the machine, a safety guard 38, and a stripping spindle 30 for stripping the insulation from the conductors.

The stripping spindle 30 is rotated by the rotor 54 that is driven by the motor 52 of the pipe threading machine 22. The motor 52 of the pipe threading machine includes a control 58 for operating the motor 52 in the forward and reverse rotational directions and for stopping the motor 52.

The cable entry guide 32 and the exit cable guide 34 are each supported by the cylindrical, horizontal rods 56a and 56b, respectively, on either side of the pipe threading machine 22. Typically a pipe threading machine includes these cylindrical rods 56a and 56b as the support for a cutting head used to cut the threads into a pipe.

Figure 2A:
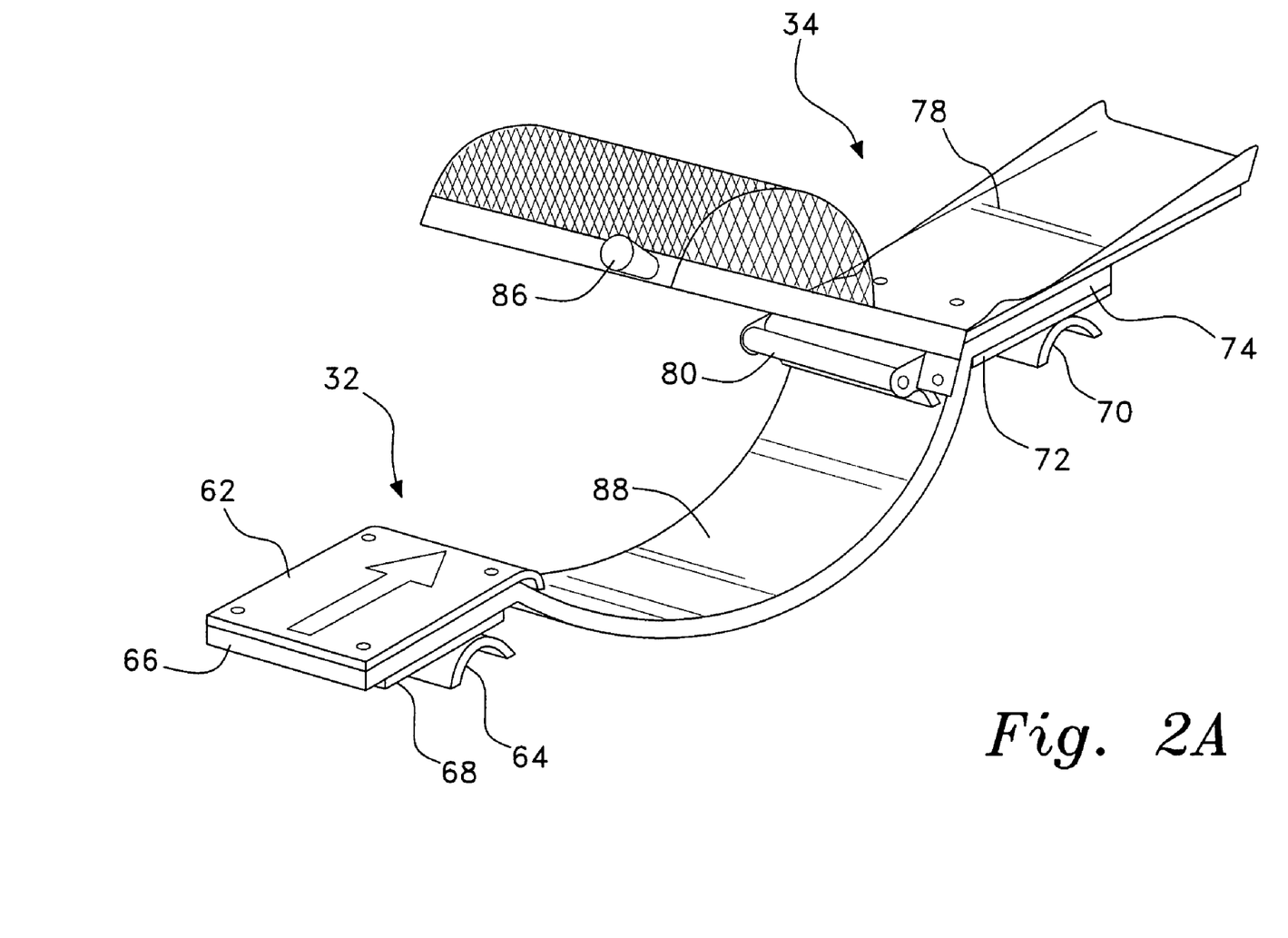
FIG. 2A is a side perspective view of the cable guide mechanism of the cable insulation stripping machine according to the present invention, the lower clamp guides being omitted.
Figure 2B:
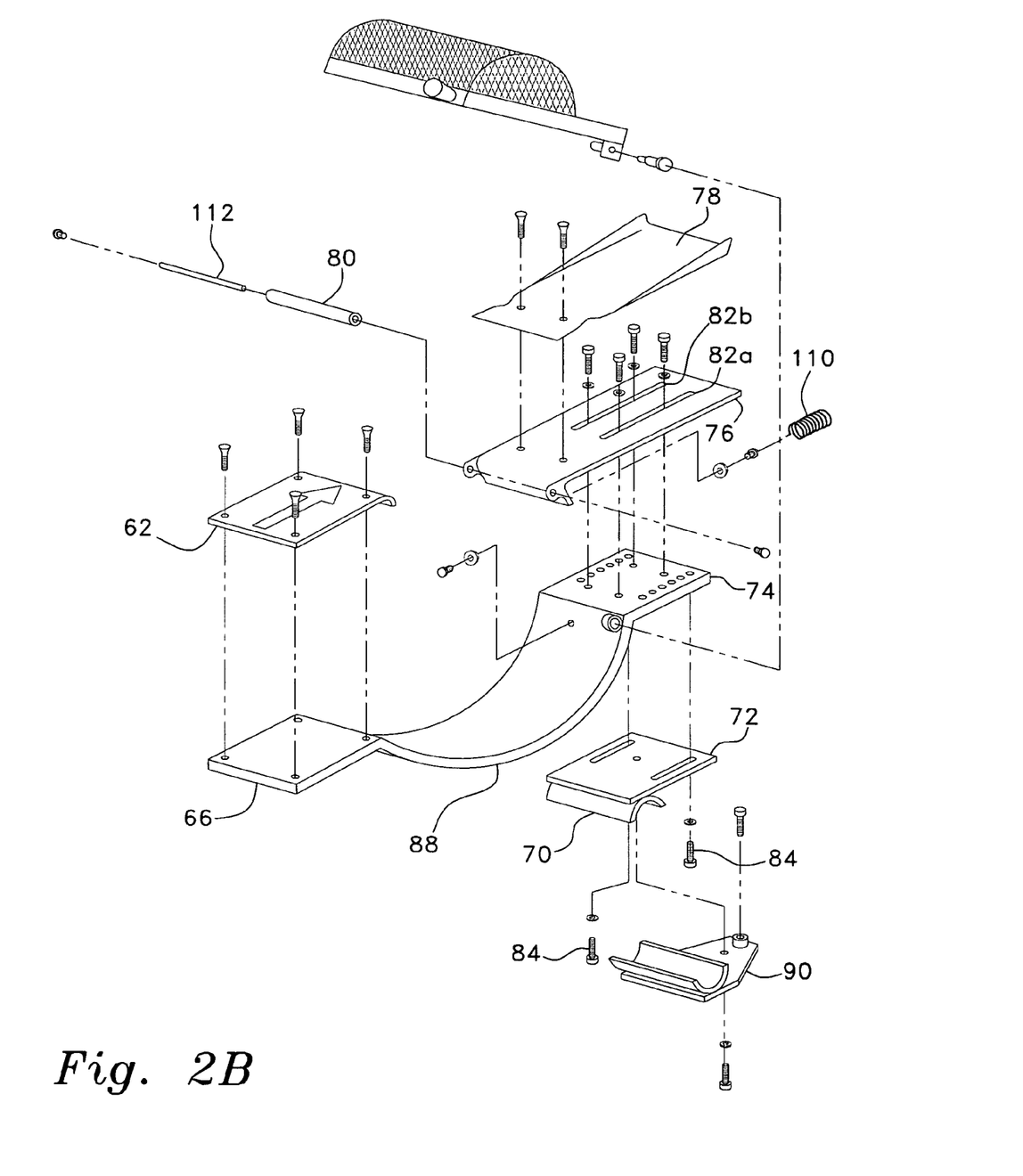
FIG. 2B is an exploded view of the cable guide mechanism of FIG. 2A, the front guide clamp being omitted to show other features of the invention.

Referring to FIGS. 1, 2A and 2B, details of the cable entry guide 32, and the exit cable guide 34 may be appreciated. The cable guides 32 and 34 each include a guide base 66 and 74, respectively, that supports the other components of the respective guide 32 and 34. The supporting bases 66 and 74 for the guides 32 and 34 are each provided with a plurality of holes that allow the components of the guides to be attached in various positions to accommodate differing dimensions for the specific pipe threading machine to which the cable insulation stripping machine 20 is adapted.

The cable guides 32 and 34 each include mounting clamps for attaching the cable guides 32 and 34 to the pipe cutting head guides of the pipe threading machine. Each mounting clamp includes an upper clamp portion 64 and 70 attached to a clamp base plate 68 and 72. The upper clamp portions 64 and 70 are arcuate plates adapted to conform to cylindrical rods 56a and 56b of the pipe cutting head guide. The clamp bases 68 and 72 are each provided with elongated slots along the length of the clamp bases to allow them to receive bolts 84 and nuts at various positions along the respective cable guide base 66 and 74 that secure a corresponding lower guide clamp around the pipe cutting head guides.

The cable guide clamps further comprise lower clamp portions 90 (only the rear lower guide clamp being shown in FIG. 2B, as the front lower guide clamp is identical), which are arcuate plates attached to a flat plate having bolt apertures and bosses thereon, the arcuate plate being adapted to conform to the pipe cutting head guide rods, the upper 64 and 70 and lower 90 guide clamps forming a cylinder about the guide rods when joined. When attaching the guides to the pipe threading machine 22, the lower clamp portions 90 are mated with the respective upper clamp portion around the circumference of the pipe threader cutting head guide 56a and 56b. The lower clamp 90 is secured with a bolt and nut to the respective guide support base. Tightening the clamp bolt forces the upper and lower clamp portions against the pipe threader cutting head guides 56a and 56b, fixing the position of the cable guides 32 and 34 and the cable insulation stripping machine 20 onto the pipe threading machine 22.

The cable guides 32 and 34 are connected by a rigid yoke 88. The yoke 88 maintains the relative positions of the cable guides 32 and 34. The yoke 88 has an arcuate, concave shape so that the space between the cable guides provides clearance for the rotating portions of the cable insulation stripping machine 20.

When the cable insulation stripping machine 20 is installed on the pipe threading machine 22, the entry and exit cable guides 32 and 34 are positioned on either side of the stripping spindle 30.

The entry cable guide 32 has a guide surface 62 for leading the cable into the cable insulation stripping machine 20. The guide surface 62 is made of a material that allows the insulating jacket of a cable to slide freely along its surface. The guide surface 62 is attached to the upper surface of the entry supporting base 66 using any secure attachment means, such as screws or adhesives.

The exit cable guide 34 has a spring-loaded guide assembly. The guide assembly comprises a sliding guide support 76. The sliding guide support 76 is a plate provided with slots 82a and 82b, which slidably engage screws securing the sliding guide support 76 to the exit guide supporting base 74 to allow the sliding support 76 to slide towards and away from the stripping spindle 30. A spring 110 is attached to the sliding guide support 76 between the yoke 88 and a flange depending from the sliding support 76 to provide bias to push the sliding support 76 towards the stripping spindle 30. The guide assembly further comprises a guide ramp 78 angled upwards and away from the entry guide 32. The guide ramp 78 is attached to the sliding guide support 76 using screw, adhesive or other secure attachment means. At the end of the sliding guide support 76 nearest the stripping spindle 30, a roller 80 is mounted on an axle 112 attached to the end of, and across the width of, the sliding guide support 76. When the components of the cable insulation stripping machine 20 are installed on a pipe threading machine, the spring 110 pushes the sliding guide support 76 up against the stripping spindle 30, and the roller 80 allows the stripping spindle 30 to turn freely while resting against the roller 80 of the sliding guide support 76.

Pressing the sliding guide support 76 up against the stripping spindle allows the guide ramp 78 to collect the conductors and the upper half of the insulation (omitted from FIG. 1 for clarity) as the insulation is stripped from the cable and prevents the conductors from winding onto the spool of the stripping spindle 30 along with the lower half of the stripped insulation. The effective diameter of the stripping spindle 30 increases as insulation is wound on the spool and the sliding guide support 76 is pressed back by the collected insulation against the spring 110, maintaining the guide ramp 78 in position to continue to collect and direct the stripped conductors.

Figure 3A:
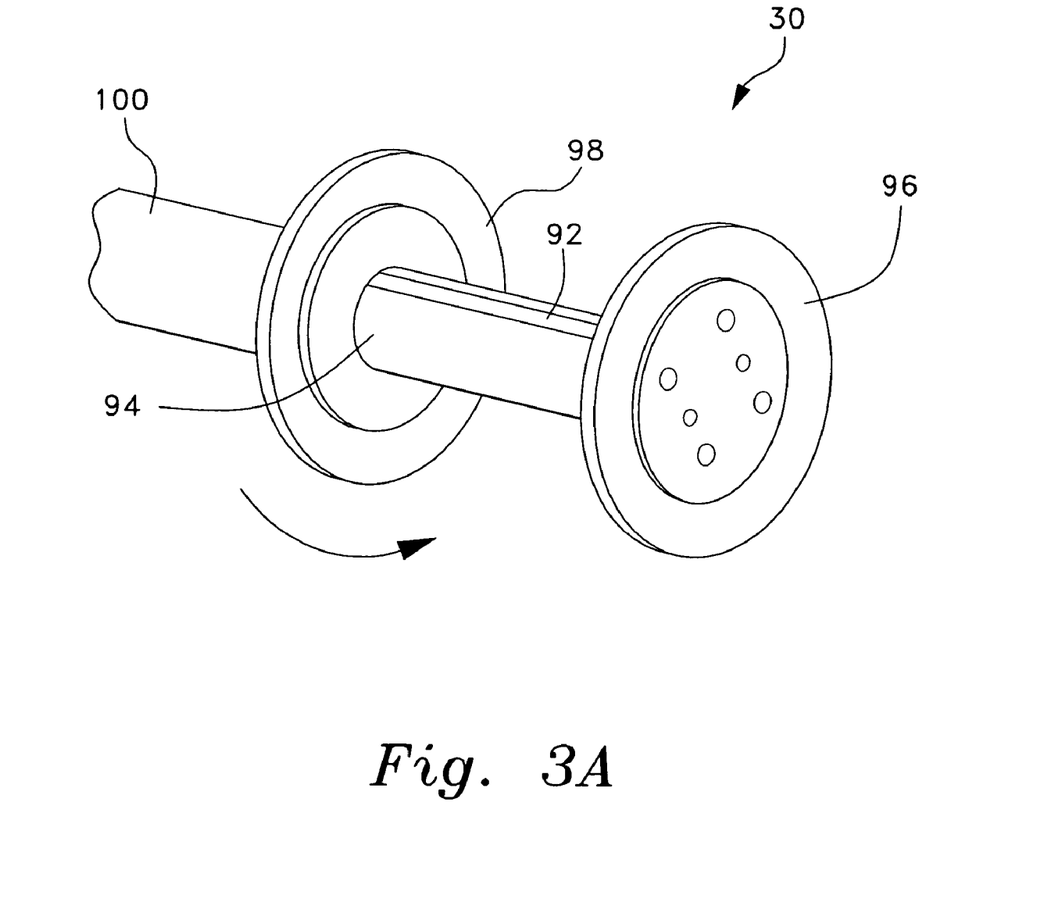
FIG. 3A is a perspective view of an insulation stripping and take up spool of the cable insulation stripping machine according to the present invention.
Figure 3B:
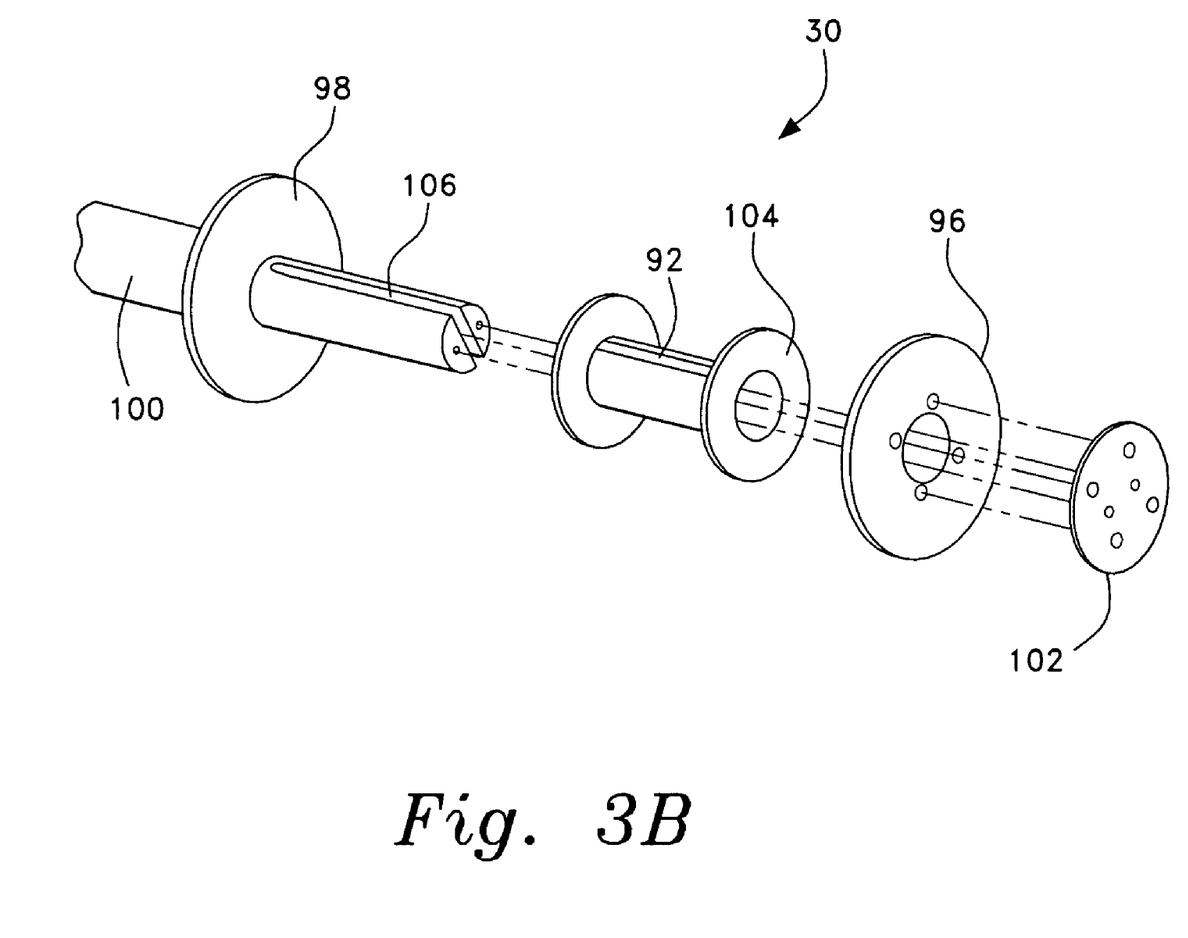
FIG. 3B is an exploded view of the insulation stripping and take up spool of FIG. 3A.

Referring now to FIGS. 1, 3A, and 3B, the construction of the stripping spindle 30 may be understood. The stripping spindle 30 includes a spindle axle 100. When the cable insulation stripping machine 20 is installed on a pipe threading machine 22, a first end of the spindle axle 100 is held by a chuck (not shown) at the center of the motor 52 of the cable threading machine. At the opposite or free end of the spindle axle 100, a slot 106 is cut across the diameter of the spindle axle 100 and along a length of the axle 100. The spindle slot 106 is wide enough to accommodate the largest thickness of the insulation of the cable to be stripped. A first circular stop disk 98 concentric with the spindle axle 100 is located at the end of the slot opposite the free end of the spindle axle 100.

A locking spool 104 concentric with the spindle axle 100 is located at the free end of the spindle axle 100. The locking spool 104 has a slot 92 cut into the body of the spool 104. The locking spool 104 can be rotated on the spindle axle 100 so that the slot 92 on the locking spool 104 is aligned with the slot 106 in the spindle axle 100. The locking spool 104 is retained on the spindle axle 100 by a second circular stop disk 96 concentric with the spindle axle 100. The second stop disk 96 is attached to the end of the spindle axle 100 by an endplate 102 fastened to the end of the spindle axle 100 and to the second stop plate 98 with screws (not shown). The locking spool 104 may be rotated freely on the spindle axle 100 between the first and second circular stop disks 96 and 98.

By referring to FIGS. 1, 3A, 3B and 4, the process of installing a cable 120 to be stripped into the pipe threading machine may be understood. Before installing the cable 120 into the stripping machine, the cable 120 is prepared by scoring the cable 120 along the length to be stripped. The exemplary cable 120 has three insulated conductors 124a, 124b, and 124c covered by an outer insulating jacket 122. The cable jacket 122 is scored in two places along score lines 128 separated 180° around the circumference of the cable jacket 122 and defining an upper and lower half of the jacket. A portion of the cable insulation at the free end of the cable 120 approximately 1.5 inches long is cut completely through at the score lines 128 and the insulation at the cut through portion is folded back to form a flap 126. The motor 52 of the pipe threading machine 22 is jogged until the face of the spindle slot 106 is rotated toward the entry of the cable insulation stripping machine 20.

Figure 4:
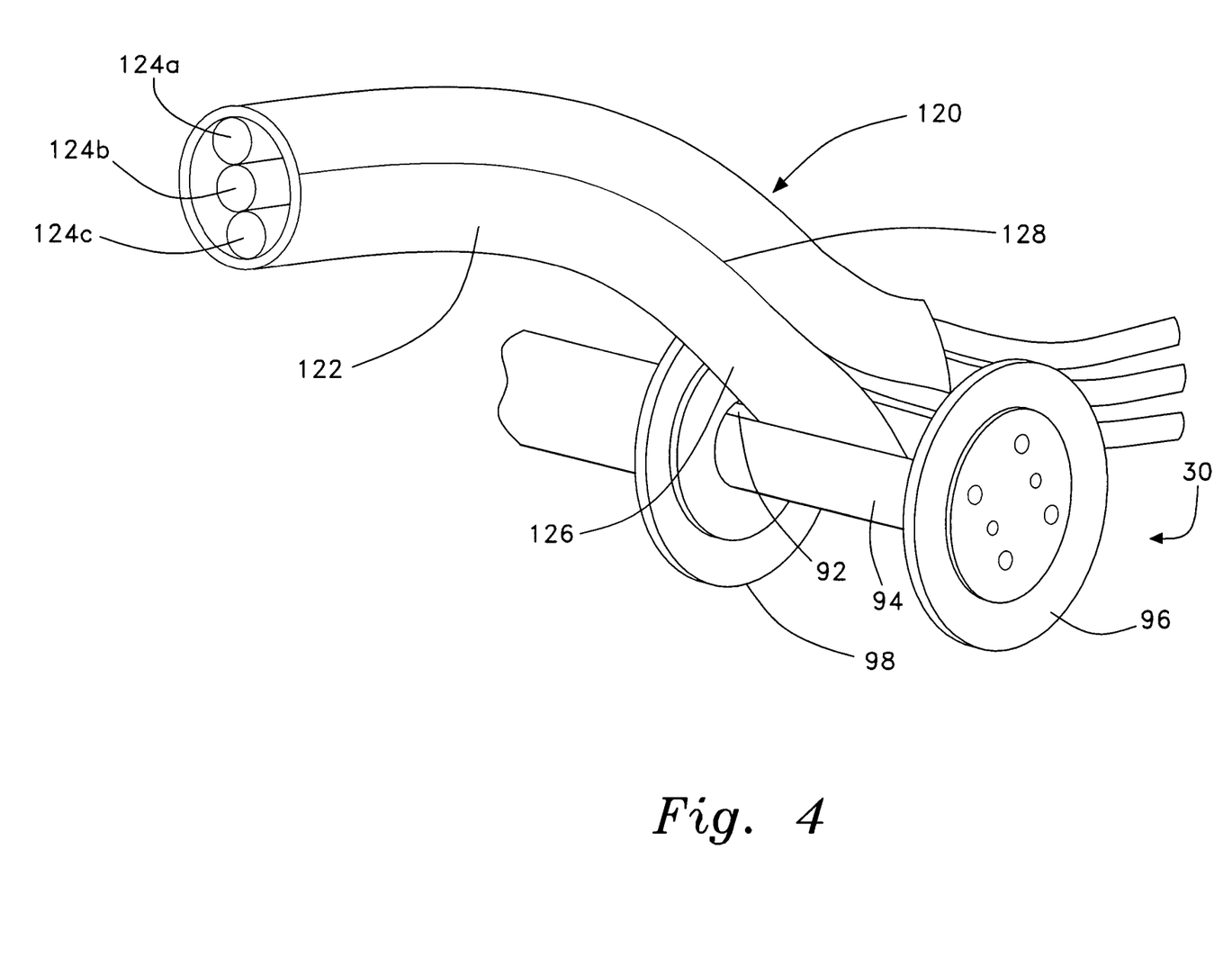
FIG. 4 is a perspective view of a multi-conductor cable positioned for stripping on the stripping and take-up spool of the cable insulation stripping machine according to the present invention.

The locking spool 104 is turned on the shaft of the spindle axle 100 until the spool slot 92 is aligned with the spindle slot 106, and the flap 126 of the cable jacket 122 is inserted into the locking spool slot 92 and the spindle slot 106. When the pipe threading motor 52 rotates the spindle 30 in the forward direction (clockwise) at the start of a stripping operation, the weight of the cable 120 resting against the locking spool initially holds the spool 104 in place so that the rotation of the spindle axle 100 causes the body of the spool 104 to close off the spindle slot 106, pinching the cable insulation flap 126 and preventing the flap 126 from slipping out of the spindle axle slot 106. The locking action generated from pinching the cable between the spindle slot 106, and the locking spool slot 92 effectively creates a self-adjusting pinch slot that securely holds insulation of varying thickness, making it unnecessary to manually adjust the cable insulation stripping machine 20 to accommodate different sizes and types of insulating cables.

Once the cable 120 is installed on the cable insulation stripping machine 20, operating the motor 52 in the forward direction strips the lower half of the outer jacket 122 from the inner conductors 124a, 124b, and 124c, and winds the removed lower half of the insulation onto the stripping spindle 30. When the desired length of cable insulation has been removed, the motor 52 is stopped. Reversing the motor 52 then allows unwinding the insulation from the spindle 30, and removing the cable 120 from the cable insulation stripping machine 20.

When the cable insulation stripping machine 20 is installed on the pipe threading machine, the space surrounding the stripping spindle 30 constitutes the work area, with the region of the area near the entry cable guide 32 being the front of the work area and the area at the exit cable guide 34 being the back or rear of the work area.

The cable insulation stripping machine 20 may be provided with a safety guard. The details of the safety guard may be appreciated by referring to FIGS. 1 and 5. The safety guard 38 includes a guard frame 130. The guard frame 130 is pivotally attached to a stationary portion of the cable stripping machine 20 near the exit cable guide 34, such as the yoke 88 or the supporting base 74 for the exit cable guide 34. The pivotal attachment of the frame 130 allows the frame 130 to rotate in a plane perpendicular to the spindle axis of rotation, and into and out of the work area.

Figure 5:
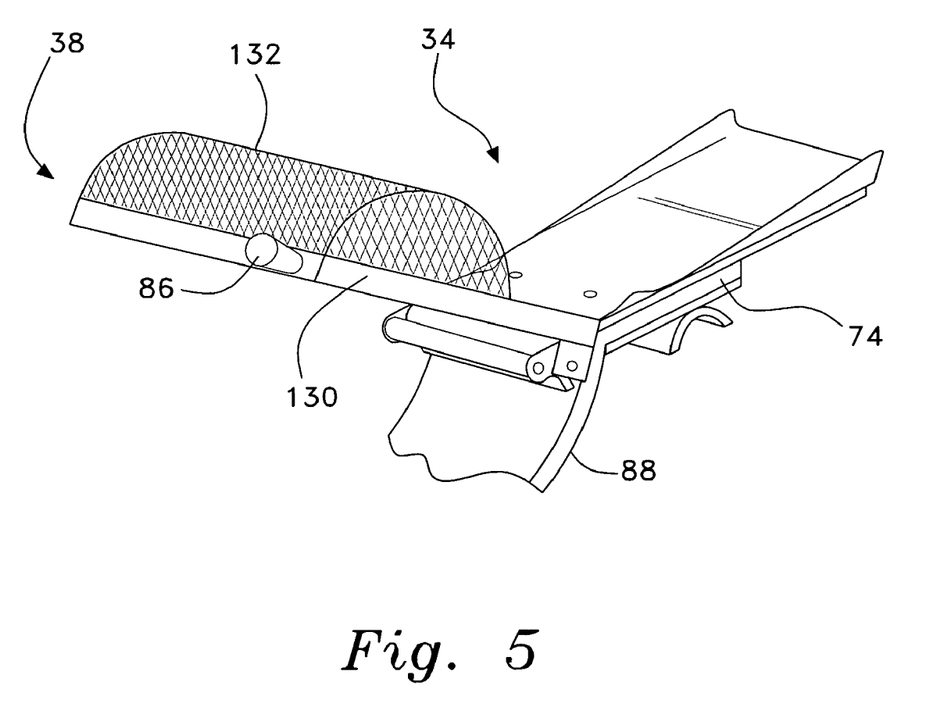
FIG. 5 is a perspective view of a safety guard of the cable insulation stripping machine according to the present invention.

Attached to the guard frame 130 is a safety screen 132. Preferably the safety screen 132 is constructed of a metal mesh or a transparent material, allowing the stripping area of the cable stripping machine 20 to be viewed through the safety screen 132. When the guard frame 130 is pivoted into place above the working area, the screen 132 extends above the work area and shields an operator working at the front of the work area as the operator feeds cable into the cable insulation stripping machine 20. A handle 86 attached to the front of the frame 130 provides a purchase point for moving the guard 38 into the work area during a stripping operation and out of the work area while inserting or removing a cable from the cable insulation stripping machine 20.

Referring to FIGS. 1 and 3A, the process of installing the cable insulation stripping machine on a pipe threading machine includes inserting the axle 100 of the cable stripping spindle 30 into the chuck (not shown) of the rotor 54 of the pipe threading machine. The chuck is tightened to securely hold the spindle 30. The guide assembly including the yoke 88, entry cable guide 32, and the exit or outlet cable guide 34 are installed so that the yoke 88 is below the spindle 30, and the entry and exit cable guides 32 and 34 are on opposite sides of the spindle. The entry and exit cable guides 32 and 34 are positioned vertically so that the plane of the upper surfaces of the guides is approximately tangent to the top of the take up spool of the spindle 30. Shims between the guide bases 66 and 74 and the upper clamp supports can be used to adjust the vertical position of the cable guides 32 and 34. The entry and exit guides 32 and 34 are clamped to the pipe threading machine cutting head guides, and are positioned horizontally so that the spindle 30 is centered between the support bases for the entry and exit cable guides 32 and 34.

Once the cable insulation stripping machine components are installed on the pipe threading machine and positioned as described above, the cable insulation stripping machine components do not need to be adjusted for a particular type or size of insulated cable.

In one embodiment of the invention, the components of the cable insulation stripping machine are adapted to fit on a Ridgid 535 pipe threading machine. Ideally the pipe threading machine is powered by a motor rated at least ½ horsepower, with controls allowing the motor to be operated in a forward and a reverse direction of rotation. Preferably the motor control allows controlling the speed of rotation of the motor to speeds of less than 100 revolutions per minute. The slot in the spindle locking spool 30 and the spindle axle 100 are approximately four inches long and 2 inch wide. The particular components, dimensions and ratings are provided for enablement purposes and do not limit the invention to the particular components, dimensions and ratings detailed.

Providing components adapted to fit on a piece of equipment, such as a pipe threading machine, which is commonly used by electricians, allows constructing a cable insulation stripping machine in accordance with the invention to be constructed economically because a separate motor, support, and motor control system do not have to be provided or purchased.

In the preferred embodiment, the horizontal positions of the clamps are adjustable as described above to allow the cable insulation stripping machine 20 to be attached to pipe threading machines of varying sizes where the horizontal pipe cutting head supports may be separated by varying distances. In an alternate embodiment, the cable stripping mechanism may be provided with clamps in fixed positions, allowing for a less expensive model when the cable stripping mechanism only needs to accommodate only one or more particular makes of pipe threading machine.

The clamping means provided with the capable guide may be adapted to mount to any fixed portion of a pipe threading machine or other rotating machine, such as the horizontal frame or the motor casing.

In yet another embodiment a dedicated motor, motor control, and frame are provided and the components of the cable insulation stripping machine 20, such as the entry cable guide and the exit cable guide, are supported directly by the dedicated frame. The spindle 30 may be mounted in a chuck of the rotor or may be directly attached to the shaft of the motor.

It is to be understood that the present invention is not limited to the embodiments described above, but encompasses any and all embodiments within the scope of the following claims.

We claim:

1. A cable insulation stripping machine, comprising:
   an entry guide plate, an exit guide plate, and an arcuate, semi-cylindrical yoke connecting the entry guide plate and the exit guide plate;
   an axle attachable to a reversible motor, the axle having a slot defined axially therein;
   whereby a portion of a jacket of a multi-conductor cable, the jacket having two scores defining an upper half and a lower half of the jacket, is inserted into the slot in the axle to simultaneously strip the jacket from the cable and wind the lower half of the jacket about the axle when the axle rotates in a forward direction, the jacket being unwound from about the axle when the axle is rotated in a reverse direction.

2. The cable insulation stripping machine according to claim 1, further comprising a spool rotatably mounted on the axle, the spool having a slot defined therein and the spool combined with the axle form a stripping spindle; whereby the portion of the jacket of the multi-conductor cable is inserted into the slot in the spool and into the slot in the axle and wherein when the axle rotates in a forward direction, the spool rotates slightly about the axle to thereby grip the portion of the jacket, thereby acting as a self-adjusting slot.

3. The cable insulation stripping machine according to claim 2, wherein the exit guide plate further comprises:
   a sliding guide support, the sliding guide support being a plate provided with slots which slidably engage screws securing the sliding guide support to the exit guide plate, to allow the sliding guide support to slide towards and away from the stripping spindle.

4. The cable insulation stripping machine according to claim 3, wherein the sliding guide support further comprises:
   a flange depending from a first end of the sliding guide support; and
   a spring attached to the sliding guide support between the yoke and the flange depending from the sliding support; wherein
   the spring provides bias to push the sliding support towards the stripping spindle.

5. The cable insulation stripping machine according to claim 4, wherein the sliding guide support further comprises:
   a roller axle mounted the first end of the sliding guide support;
   a roller mounted on the axle; and wherein
   the roller allows the stripping spindle to turn freely while resting against the roller of the sliding guide support.

6. The cable insulation stripping machine according to claim 5, wherein the sliding guide support further comprises:
   a guide ramp angled upwards and away from the entry guide plate;
   wherein the spring pressing the sliding guide support and the roller up against the stripping spindle allows the guide ramp to collect the conductors as the jacket is stripped from the cable thereby preventing the conductors from winding onto the spool of the stripping spindle.

7. The cable insulation stripping machine according to claim 1, further comprising a safety guard pivotally attached to a stationary portion of the cable stripping machine.

8. The cable insulation stripping machine according to claim 7, wherein the safety guard further comprises:

a guard frame having a front; and a safety screen.

9. The cable insulation stripping machine according to claim 8, wherein the safety screen is constructed of a metal mesh.

10. The cable insulation stripping machine according to claim 8, wherein the safety screen is constructed of a transparent material.

11. The cable insulation stripping machine according to claim 8, wherein the safety guard frame comprises:

a handle attached to the front of the safety guard frame.

12. The cable insulation stripping machine according to claim 1, wherein the entry guide plate further comprises:

a guide surface, the guide surface being made of a material that allows the insulating jacket of the cable to slide freely along the guide surface.

13. The cable insulation stripping machine according to claim 1, further comprising means to attach the cable insulation stripping machine to a host machine.

14. The cable insulation stripping machine according to claim 13, wherein the host machine is a pipe threading machine having two cylindrical rods that function as pipe cutting head guides and the means to attach the cable insulation stripping machine to a host machine are clamp bases and the clamp bases comprise:

two upper clamp portions, one upper clamp portion being attached to the entry guide plate, and the other upper clamp portion being attached to the exit guide plate; and two lower guide clamp portions; wherein the lower clamp portions are mated with the respective upper clamp portions around the circumference of the pipe cutting head guides to attach the cable insulation stripping machine to the pipe threading machine.

15. The cable insulation stripping machine according to claim 14, wherein the clamp bases further comprise:

elongated slots along the length of the clamp bases to allow them to receive bolts and nuts at various positions along the respective cable guide plate that allow the guide plates to be attached in various positions to accommodate differing dimensions for the pipe threading machine.

16. The cable insulation stripping machine according to claim 1, wherein the cable insulation stripping machine is a stand alone machine further comprising the motor attached to the axle.

* * * * *